United States Patent
Peterson (10) Patent No.: US 11,144,563 B2
(45) Date of Patent: Oct. 12, 2021

(54) RECURRING SEARCH AUTOMATION WITH SEARCH EVENT DETECTION

(71) Applicant: Matthew E. Peterson, Kirkland, WA (US)

(72) Inventor: Matthew E. Peterson, Kirkland, WA (US)

(*) Notice: Subject to any disclaimer, the term of this patent is extended or adjusted under 35 U.S.C. 154(b) by 943 days.

(21) Appl. No.: 13/670,307

(22) Filed: Nov. 6, 2012

(65) Prior Publication Data

US 2014/0129950 A1    May 8, 2014

(51) Int. Cl.
*G06F 16/248*    (2019.01)

(52) U.S. Cl.
CPC .................. *G06F 16/248* (2019.01)

(58) Field of Classification Search
CPC .............................................. G06F 17/30864
See application file for complete search history.

(56) References Cited

U.S. PATENT DOCUMENTS

| | | | |
|---|---|---|---|
| 6,424,966 B1 | 7/2002 | Meyerzon et al. | |
| 6,438,539 B1 | 8/2002 | Korolev et al. | |
| 6,631,369 B1 | 10/2003 | Meyerzon et al. | |
| 7,080,073 B1 | 7/2006 | Jiang et al. | |
| 7,089,233 B2 | 8/2006 | Osias | |
| 7,124,127 B2 | 10/2006 | Sakamoto et al. | |
| 7,571,158 B2 | 8/2009 | Vedula | |
| 7,685,133 B2 | 3/2010 | Sample et al. | |
| 7,793,326 B2 | 9/2010 | McCoskey et al. | |
| 7,877,368 B2 | 1/2011 | Waters et al. | |
| 7,899,701 B1 | 3/2011 | Odom | |
| 8,239,275 B1 | 8/2012 | Lyren et al. | |
| 2004/0181596 A1* | 9/2004 | Sabiers | G06F 16/972 709/227 |

(Continued)

FOREIGN PATENT DOCUMENTS

| | | |
|---|---|---|
| CA | 2413105 C | 6/2003 |
| WO | 2001004799 A1 | 1/2001 |
| WO | 2007052285 A2 | 5/2007 |

OTHER PUBLICATIONS

Banerjee, 2003, GUI Ripping: Reverse Engineering of Graphical User Interfaces for Testing, pp. 1-9.*

(Continued)

*Primary Examiner* — Matthew J Ellis
(74) *Attorney, Agent, or Firm* — Kilpatrick Townsend & Stockton LLP (57) ABSTRACT

Recurring search automation with search event detection is enabled. Responsive to detection of search events and/or user triggering, a recurring search may be generated. The recurring search may be based on the detected search event, for example, based on search parameters of the detected search event. The recurring search may be associated with a recurrence schedule. Search results may be generated by performing the recurring search in accordance with the recurrence schedule. Data corresponding to the generated search results may be provided. For example, the results may be provided for presentation in accordance with user preferences. The relevant search events may be detected by a search detection module. For example, the search detection module may be incorporated into a user client such as a web browser. The recurring searches may be maintained by a recurring search service.

24 Claims, 9 Drawing Sheets

(56) References Cited

U.S. PATENT DOCUMENTS

| | | | |
|---|---|---|---|
| 2005/0114317 A1* | 5/2005 | Bhide | G06F 16/951 |
| 2006/0106793 A1* | 5/2006 | Liang | G06F 17/30654 |
| 2006/0129463 A1 | 6/2006 | Zicherman | |
| 2006/0248078 A1* | 11/2006 | Gross et al. | 707/5 |
| 2006/0288087 A1 | 12/2006 | Sun | |
| 2007/0016514 A1* | 1/2007 | Al-Abdulqader | G06Q 10/06 705/37 |
| 2007/0118607 A1 | 3/2007 | Nelissen | |
| 2008/0091661 A1* | 4/2008 | Plow et al. | 707/3 |
| 2008/0140577 A1 | 6/2008 | Rahman et al. | |
| 2009/0217309 A1* | 8/2009 | Grechanik | G06F 8/38 719/328 |
| 2009/0222440 A1 | 9/2009 | Hantke et al. | |
| 2009/0254447 A1 | 10/2009 | Blades | |
| 2009/0287684 A1 | 11/2009 | Bennett | |
| 2010/0114857 A1 | 5/2010 | Edwards et al. | |
| 2010/0217757 A1 | 8/2010 | Fujioka | |
| 2010/0306366 A1* | 12/2010 | Cragun | G06F 8/67 709/224 |
| 2011/0087661 A1* | 4/2011 | Quick | G06F 16/435 707/732 |
| 2011/0276946 A1* | 11/2011 | Pletter | G06F 11/3688 717/124 |
| 2011/0307811 A1* | 12/2011 | Kim | G06F 8/61 715/760 |
| 2012/0123910 A1 | 5/2012 | George | |
| 2012/0254320 A1* | 10/2012 | Dove et al. | 709/206 |
| 2014/0012841 A1* | 1/2014 | Will et al. | 707/728 |

OTHER PUBLICATIONS

Google, Google Alerts—Monitor the Web for interesting new content, [online] 2012 [retrieved on Apr. 18, 2013] Retrieved from the Internet: <URL http://www.google.com/alerts>.

Google, Basics—Alerts Help, [online] 2012 [retrieved on Apr. 18, 2013] Retrieved from the Internet: <URL: http://support.google.com/alerts/answer/175926?hl=en>.

Google, What are Google Alerts?—Alerts Help, [online] 2013 [retrieved on Apr. 18, 2013] Retrieved from the Internet: <URL https://support.google.com/alerts/answer/175925?hl=en>.

Bing: Ask Friends for Ideas About a Search, [online]. Microsoft Corporation, 2012 [retrieved on Nov. 6, 2012]. Retrieved from the Internet: <URL: http://onlinehelp.microsoft.com/en-US/bing/jj126129.aspx>.

Cornell, Paul, "Using Macros to Speed Up Your Work." [online]. Microsoft Corporation, 2012 [retrieved on Nov. 6, 2012]. Retrieved from the Internet: <URL: http://office.microsoft.com/en-US/support/using-macros-to-speed-up-your-work-HA001019230.aspx>.

* cited by examiner

RECURRING SEARCH AUTOMATION WITH SEARCH EVENT DETECTION

FIELD OF THE INVENTION

This invention pertains generally to information processing and, more particularly, to computer-facilitated information processing.

BACKGROUND

At work and at home, computers have become a part of our daily lives. Many modern computers are connected to one or more networks including large public networks such as the Internet, and are used to obtain and present a wide variety of content from plain text to rich media content including audio and video. There is such a large, and constantly increasing, amount of content available from network-connected computers that it has become increasingly common to "search" for particular items of content instead of having to know the content's exact location in the network. For example, so-called search engines can match keywords supplied by a user to indexed content and provide the user with a list of relevant content and/or references thereto.

There are many different types of content. Examples include documents such as hypertext documents and so-called web pages, static images, audio, video, news such as financial news, financial data such as stock and commodity prices, physical and digital items for purchase, commercial offers, maps, calendars and scheduled events, encyclopedia articles, magazine articles, dictionary definitions, and more. Content consumers use these different types of content in different ways and, in particular, the way in which content consumers use search to discover and obtain different types of content can be different. Conventional search has shortcomings, particularly with respect to certain types of content, and particularly with respect to content and/or content collections that change over time. These shortcomings can cause user frustration and make searching laborious and/or require significant user investment, particularly with respect to content and information gathering tasks that involve repeated execution of same or similar searches.

Conventional attempts to address such shortcomings of conventional search are inefficient, ineffective and/or have undesirable side effects or other drawbacks with respect to at least one significant use case. For example, some conventional approaches are time consuming from the point of view of a user.

Embodiments of the invention are directed toward solving these and other problems individually and collectively.

SUMMARY

Recurring search automation with search event detection is enabled. Relevant search events may be detected. For example, events related to searching by a user. Responsive to detection of such search events and/or user triggering, a recurring search may be generated. The recurring search may be based on the detected search event, for example, based on search parameters of the detected search event. The recurring search may be associated with a recurrence schedule. Search results may be generated by performing the recurring search in accordance with the recurrence schedule. Data corresponding to the generated search results may be provided. For example, the results may be provided for presentation in accordance with user preferences. The relevant search events may be detected by a search detection module. For example, the search detection module may be incorporated into a user client such as a web browser. The recurring searches may be maintained by recurring search management module and/or recurring search service.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, recurring search is automated. A user may configure one or more recurring search agents to automatically perform specified searches in accordance with a specified search schedule. The recurring search agents may be configured with search terms including but not limited to conventional plaintext keywords, one or more desired content types, and a search scope. For example, the scope of a search may be a specified set of one or more web sites and/or a broadest possible scope (e.g., the available portions of the Internet). The search schedule may be a simple search frequency (e.g., search every day, every 2 hours) and/or be based on time of day, day of week, seasons, proximity to holidays or special events, and the like. The recurring search agents may be further configured with search result delivery preferences including delivery mode (e.g., email, text, voicemail, web site, push to mobile application) and/or delivery format. The search results may be filtered, for example, with respect a search result age range (e.g., search results no older than 2 weeks, only new results since last search) and/or a geographic region (e.g., associated with a geographic location within 5 miles of my current location). By analyzing previous recurring search agent configurations by a user, configuration suggestions and/or a default configuration may be provided for the user.

In accordance with at least one embodiment of the invention, a user may explicitly initiate recurring search automation, for example, by interacting with a user interface element for that purpose. For example, a user may explicitly trigger recurring search automation configuration. Alternatively, or in addition, search events associated with a user may be automatically detected. Examples of search events that may be detected include user initiation of a search, active progression of a search by a user, submitting a search request and receiving search results. Some web sites and/or search engines may have well known user interfaces that can be parsed to detect search events. Others may have idiosyncratic interfaces and/or obfuscated interfaces (intentional or not). In accordance with at least one embodiment of the invention, search events may be detected based on one or more heuristics including heuristics with respect to user interface attributes such as structure and rendered appearance, user interaction with a user interface including similarity of current interaction to past interactions, and user interface protocol messages such as search request messages.

Figure 1:
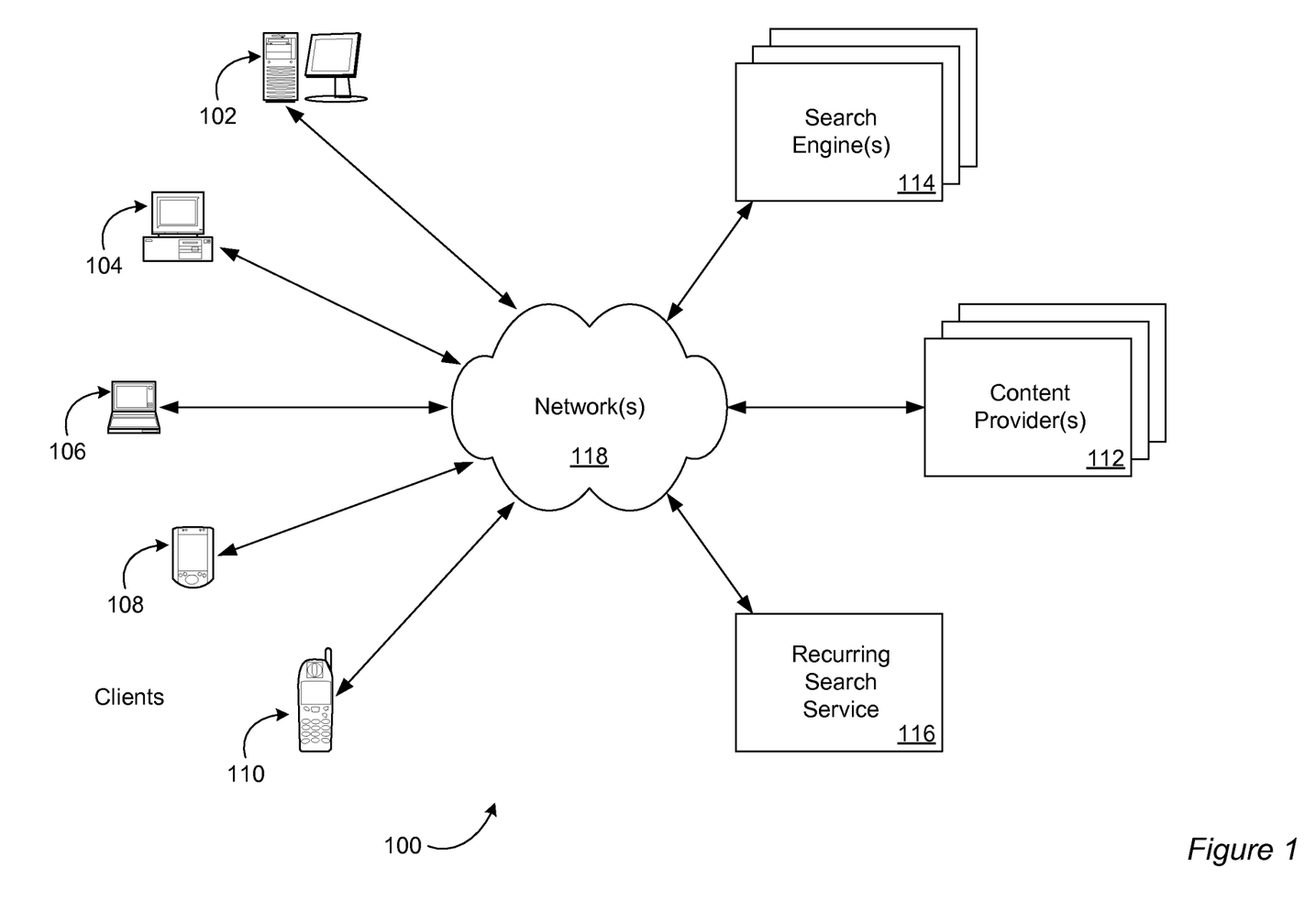
FIG. 1 is a schematic diagram depicting aspects of an example computing environment in accordance with at least one embodiment of the invention.

FIG. 1 depicts aspects of an example computing environment 100 in accordance with at least one embodiment of the invention. In the example computing environment 100, multiple clients 102-110 (and client types) may communicate with one another and with one or more content providers 112, one or more search engines 114 and a recurring search service 116 through one or more communication networks 118. For example, the clients 102-110 may include mobile phones, cell phones, smart phones, mobile computing devices, personal digital assistants, tablet computers, personal computers, laptop computers, desktop computers, workstations, computers and computing devices. The content provider(s) 112 may provide any suitable content to the clients 102-110 including documents such as hypertext documents and web pages, static images, audio, video, news such as financial news, financial data such as stock and commodity prices, physical and digital items for purchase, commercial offers, maps, calendars and scheduled events, encyclopedia articles, magazine articles, dictionary definitions and the like. The content provider(s) 112 may provide content in particular categories such as job search, health, automotive, real estate, and any suitable "classifieds" category. The content provider(s) 112 may be implemented with one or more computers including server class computers.

The search engine(s) 114 may include any suitable search engine configured to receive search requests at a search user interface and provide relevant search results in response. Examples of suitable search user interfaces include a graphical user interface (GUI) such as a web page, an application programming interface (API) such as a web service interface and/or a remote procedure call (RPC) interface, and a message interface such as a search message protocol and/or a hypertext transfer protocol (e.g., HTTP). Search requests may include search parameters such as search terms (e.g., plaintext keywords). Search results may include content collected from content provider(s) 112 and/or references thereto. The search engine(s) 114 need not be stand-alone web sites. For example, the search engine(s) 114 may be incorporated into web sites corresponding to content provider(s) 112. The search engine(s) 114 may also be considered to be a type of content provider. An example recurring search service 116 in accordance with at least one embodiment of the invention is described below in more detail with reference to FIG. 4. The network(s) 118 may incorporate, or be incorporated by, a telephonic network such as the public switched telephone network (PSTN), and a data network and/or internetwork such as a computer network, a public computer network, the Internet, and an internet protocol (IP) based network. The network(s) 118 may include any suitable networking components including wired and wireless components, switches, routers, hubs, computers and computing devices.

Figure 2:
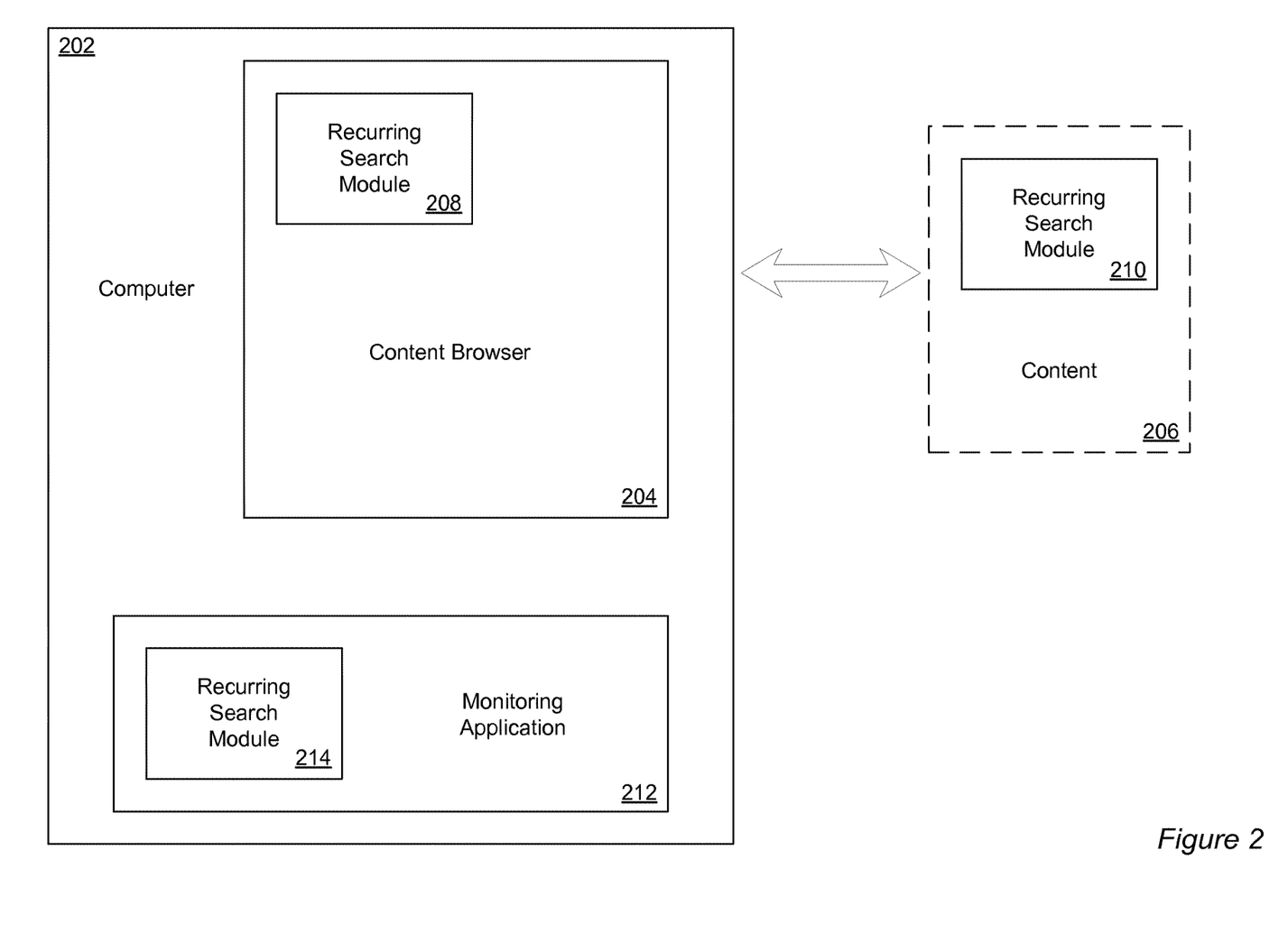
FIG. 2 is a schematic diagram depicting aspects of example recurring search module locations in accordance with at least one embodiment of the invention.

In accordance with at least one embodiment of the invention, recurring search functionality may be implemented, at least in part, with one or more recurring search modules (not shown in FIG. 1) located at a client 102-110. FIG. 2 depicts example locations of recurring search modules in accordance with at least one embodiment of the invention. A computer 202 implements, at least in part, a content browser 204 configured at least to obtain content 206 from content provider(s) 112 (FIG. 1) and present the obtained content to a user of the content browser 204. For example, the computer 202 may incorporate, or be incorporated by, one of the clients 102-110 of FIG. 1, the content browser 204 may be a web browser and the content 206 may be a web page capable of being rendered for display by the content browser 204.

The content browser 204 may include a recurring search module 208 configured at least to detect search events, particularly search events related to a recurring search and/or a potential recurring search, and to provide a recurring search agent configuration user interface, for example, in response to detection of a suitable search event and/or user triggering. An example recurring search module in accordance with at least one embodiment of the invention is described below in more detail with reference to FIG. 3. As will be apparent to one of skill in the art, the recurring search module 208 may be incorporated into the content browser 204 as an installable toolbar and/or plug-in. Alternatively, or in addition, a recurring search module 210 and/or at least a portion of the functionality of the recurring search module 208 may be incorporated in the content 206. The content 206 may be of a type that is capable of including computer-executable instructions, and the recurring search module 210 may be specified and/or implemented at least in part with such computer-executable instructions. For example, the content 206 may be specified with a hypertext markup language (e.g., HTML) and/or a script-style programming language such as a scripting language in accordance with an ECMAScript standard (e.g., JavaScript®).

As another alternative, or further in addition, the computer 202 may further include a monitoring application 212 that incorporates a recurring search module 214. The recurring search module 214 may detect search events, such as search events facilitated by the content browser 204 or other 3$^{rd}$ party application (not shown in FIG. 2) and/or user triggering, and provide the recurring search agent configuration user interface. Recurring search module functionality may be collectively implemented by one or more of the recurring search modules 206, 208, 214 depicted in FIG. 2.

Figure 3:
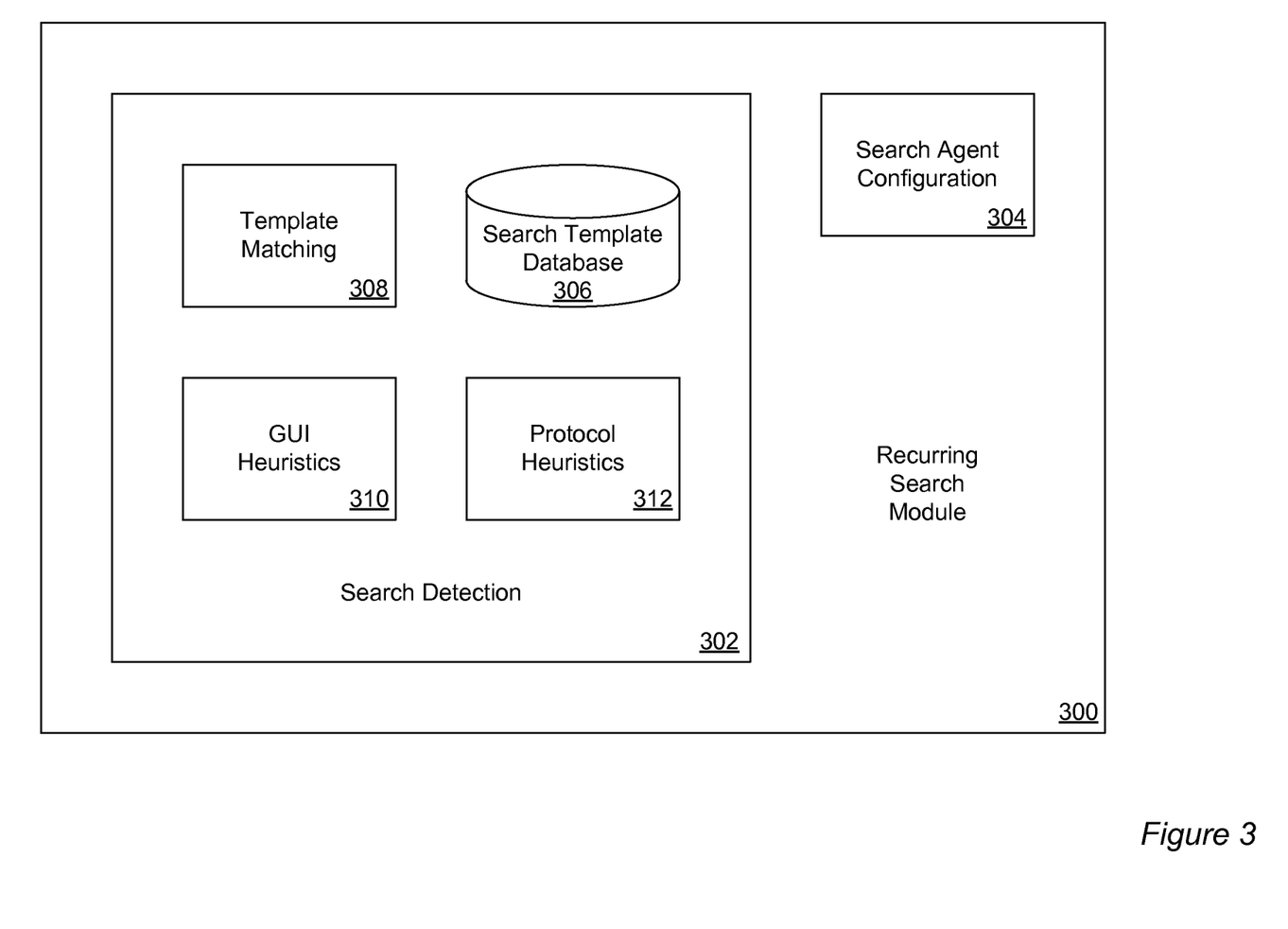
FIG. 3 is a schematic diagram depicting aspects of an example recurring search module in accordance with at least one embodiment of the invention.

FIG. 3 depicts an example recurring search module 300 in accordance with at least one embodiment of the invention. The recurring search module 300 includes a search detection module 302 configured at least to detect search events in data available to the module 302 and a search agent configuration module 304 configured at least to facilitate configuration of one or more recurring search agents of the recurring search service 116 (FIG. 1). The search detection module 302 may utilize a number of strategies for identifying search events. The search detection module 302 may include a search template database 306 and a template matching module 308 configured at least to utilize the templates in the template database 306 to identify matches between content 206 (FIG. 2) and search events. For example, the template database 306 may include one or more templates corresponding to web pages provided by search engines 114 (FIG. 1) and/or references thereto (e.g., uniform resource locators such as URLs), and the template matching module 308 may utilize the templates to identify search events such as: navigating to a search engine 114 with the content browser 204, interacting with an identified search element of a web-based user interface, interacting with an identified search element of a graphical user interface rendered by the content browser 204, submitting a search request and/or generating a search request message. Templates in the template database 306 may be specified at least in part with a pattern matching language such as regular expressions.

While some search events may be detected with non-probabilistic matching to templates, in accordance with at least one embodiment of the invention, other search events may be detected with one or more heuristics. The recurring search module 300 may include a graphical user interface (GUI) heuristics module 310 configured at least to apply heuristics to graphical user interfaces, or aspects thereof, to detect relevant search events. For example, a graphical user interface used for searching may include multiple user interface elements arranged in one or more structural relationships, and the GUI heuristics module 310 may correlate particular such user interface elements and/or particular such structural relationships with relevant search events. The GUI heuristic module 310 may determine that a relevant event has been detected when a metric based at least in part on such a correlation exceeds a threshold. As another example, the graphical user interface used for searching may be specified with a markup language such as a hypertext markup language (e.g., HTML), and the GUI heuristic module 310 may correlate particular markup language elements and/or particular structural relationships among markup language elements with relevant search events. As yet another example, the search detection module 302 may have access to a GUI interaction history of a user (not shown in FIG. 3), and the GUI heuristics module 310 may correlate elements and/or patterns of current user interaction with a GUI to elements and/or patterns in the GUI interaction history.

The search detection module 302 may further include a protocol heuristics module 312 configured at least to apply heuristics to protocols such as message protocols, or aspects thereof, to detect relevant search events. For example, interaction with a search GUI may cause one or more search protocol messages to be generated, for example, by the content browser 204 (FIG. 2) as part of communicating with the search engine(s) 114 (FIG. 1). The template matching module 308 may parse such messages to detect relevant search events. Alternatively, or in addition, the protocol heuristics module 312 may correlate particular protocol message elements and/or particular structural relationships among protocol message elements with relevant search events. For example, the content browser 204 may be a web browser that generates a hypertext transfer protocol message, such as an HTTP message, with one or more fields containing strings that correlate with a search request (e.g., a GET or POST method referencing a URL that includes the string "search" as a URL component and one or more URL component delimiters such as '/' and '?'), and the protocol heuristics module 312 may correlate the contents of the fields with relevant search events.

The recurring search module 300 may cause one or more actions in response to relevant search events detected by the search detection module 302 and/or in response to user triggering. For example, in response to detecting that a user has initiated a search, the recurring search module 300 may begin monitoring user input to collect search parameters and/or may offer an option to configure one or more recurring search agents. As another example, in response to detecting that a user has received search results, the recurring search module 300 may offer the option to configure one or more recurring search agents. The search agent configuration module 304 may be activated in response to relevant search events and may configure recurring search agents based at least in part on search parameters input by a user including search parameters obtained by monitoring. Alternatively, or in addition, the search agent configuration module 304 may cause a recurring search agent configuration user interface to be presented to a user, and receive recurring search agent configuration parameter, at least in part, in response to user interaction with the recurring search agent configuration user interface.

Figure 4:
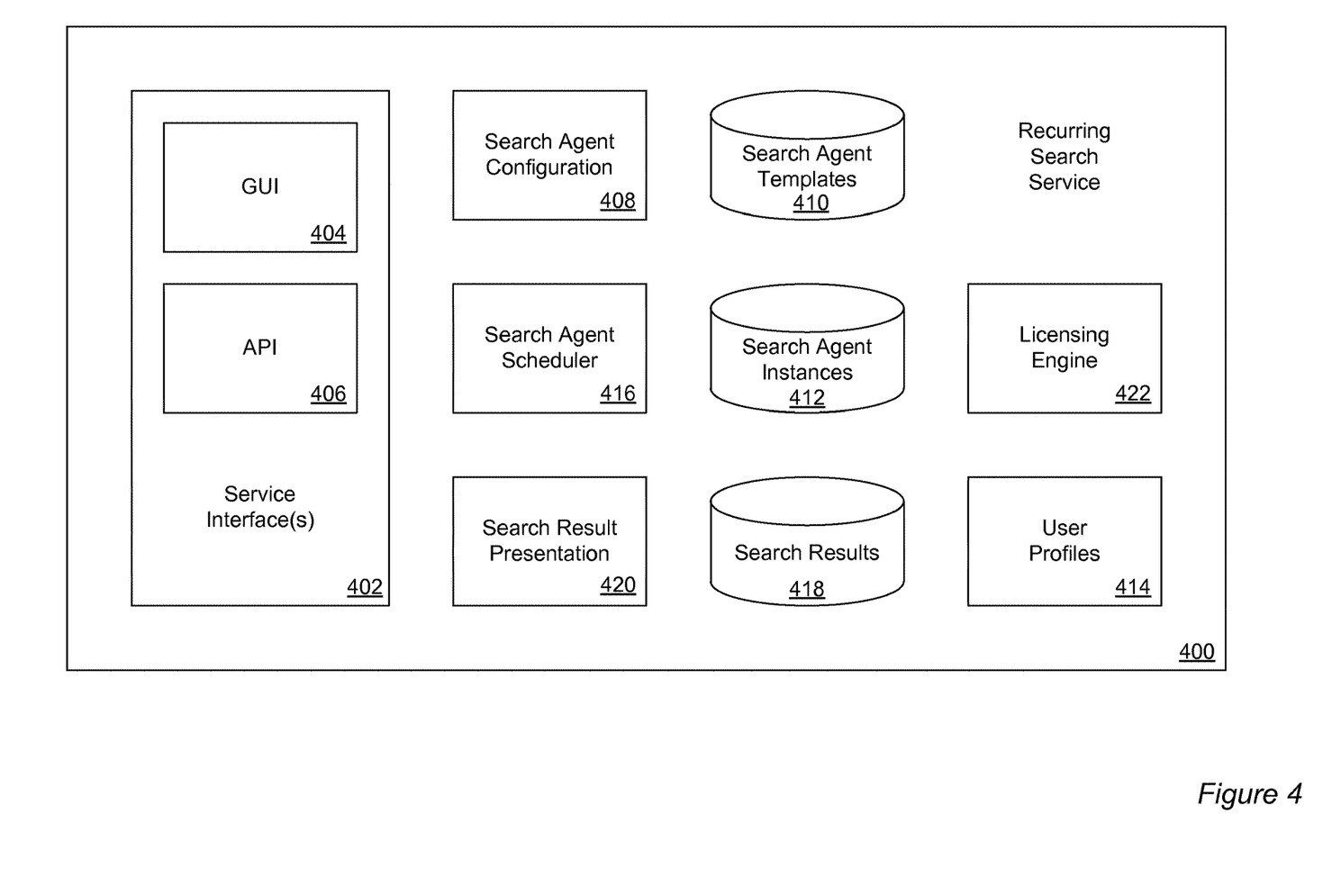
FIG. 4 is a schematic diagram depicting aspects of an example recurring search service in accordance with at least one embodiment of the invention.

The recurring search module 300 may interact with the recurring search service 116 (FIG. 1) to activate configured recurring search agents. FIG. 4 depicts an example recurring search service 400 in accordance with at least one embodiment of the invention. The recurring search service may include one or more service interfaces 402 such as a graphical user interface (GUI) 404 and/or an application programming interface (API) 406 such as a web service interface. A search agent configuration module 408 may provide a recurring search agent configuration user interface, for example, as part of the service interface(s) 402 as described above with reference to the search agent configuration module 304 of FIG. 3. In accordance with at least one embodiment of the invention, the search agent configuration modules 304 and 408 may co-operate to activate configured recurring search agents at the recurring search service 400. Alternatively, or in addition, the search agent configuration module 408 of the recurring search service 400 may act independently.

Recurring search agents may be created in accordance with one or more recurring search agent templates stored in a recurring search agent template data store 410. For example, there may be one or more recurring search agent templates corresponding to each type of content 206 (FIG. 2). Active and previously active recurring search agents ("instances" of recurring search agents) may be stored in recurring search agent instance data store 412. Each user may manage a set of one or more recurring search agents. The service interface(s) 402 may be utilized to create, read, update and delete recurring search agents including with respect to recurring search agent status, configuration and generated search results.

The recurring search service 400 may maintain a user profile 414 for each authorized user. User profiles may include user details including contact details, billing details, account status and authentication credentials (e.g., username and password). User profiles may further include user search history, recurring search service utilization history such as favorite recurring search agents and/or favorite recurring search agent configurations, and search result presentation preferences. For example, a user's profile may include a default search result presentation mode and/or format, which can be overridden by particular configured recurring search agents. User profiles 414 may be created, read, updated and deleted with the service interface(s) 402.

A recurring search agent scheduler 416 may cause active recurring search agents in the instance data store 412 to perform searches in accordance with the agent's configured schedule. Alternatively, or in addition, active recurring search agents may be self-scheduling. Recurring search agents may access any suitable search engine 114 and/or content provider 112 (FIG. 1) in order to obtain relevant search results in accordance with its configured search parameters. Search results may be stored in a search results data store 418 and associated with a generating set of recurring search agents and/or a corresponding user. A search result presentation module 420 may filter and format the search results and provide them for presentation in accordance with a user's preferences and/or the configuration of the generating recurring search agent. Examples of filtering and formatting include sorting by chronological order (e.g., newest first), identifying and removing duplicate results, filtering with respect to previously delivered results, filtering with respect to geographic proximity to the user and filtering with respect to a relevance threshold.

When the results are to be "pushed" the user (e.g., not as part of a request-response pair), there may be an administrator and/or user specified delivery limit with respect to a maximum amount of results that are pushed to the user in a specified time period. Alternatively, or in addition, a maximum push frequency may be specified. In accordance with at least one embodiment of the invention, the push constraints (e.g., delivery limit and maximum push frequency) may be met at least in part by grouping sets of search results together for delivery purposes. For example, delaying delivery of a new set of search results to satisfy the constraints and including it in a user notification when still further search results become available (e.g., in accordance with the recurring search agent's configured schedule).

Users may interact directly with the recurring search service 400 to configure and activate recurring search agents. Alternatively, or in addition, 3$^{rd}$ parties may transparently offer recurring search services to users, for example, by incorporating a recurring search module 300 (FIG. 3) in a 3$^{rd}$ party product or service such as a web site or application and/or by interacting with the service interface(s) 402 of the recurring search service 400 on behalf of the user. In such cases the 3$^{rd}$ party may request and be issued (subject to approval) a license to provide the recurring search service to its users. The license management process may be conducted through the service interface(s) 402 in co-operation with a licensing engine 422. The licensing engine 422 may monitor user requests that are associated with a license and may enforce any suitable licensing conditions.

Although shown as separate in FIG. 1, the recurring search service 400 may be incorporated into the recurring search module 300 of FIG. 3 and/or one or more of the clients 102-110 of FIG. 1. When integrated into a system, the recurring search service 400 is sometimes called a recurring search management module.

Figure 5:
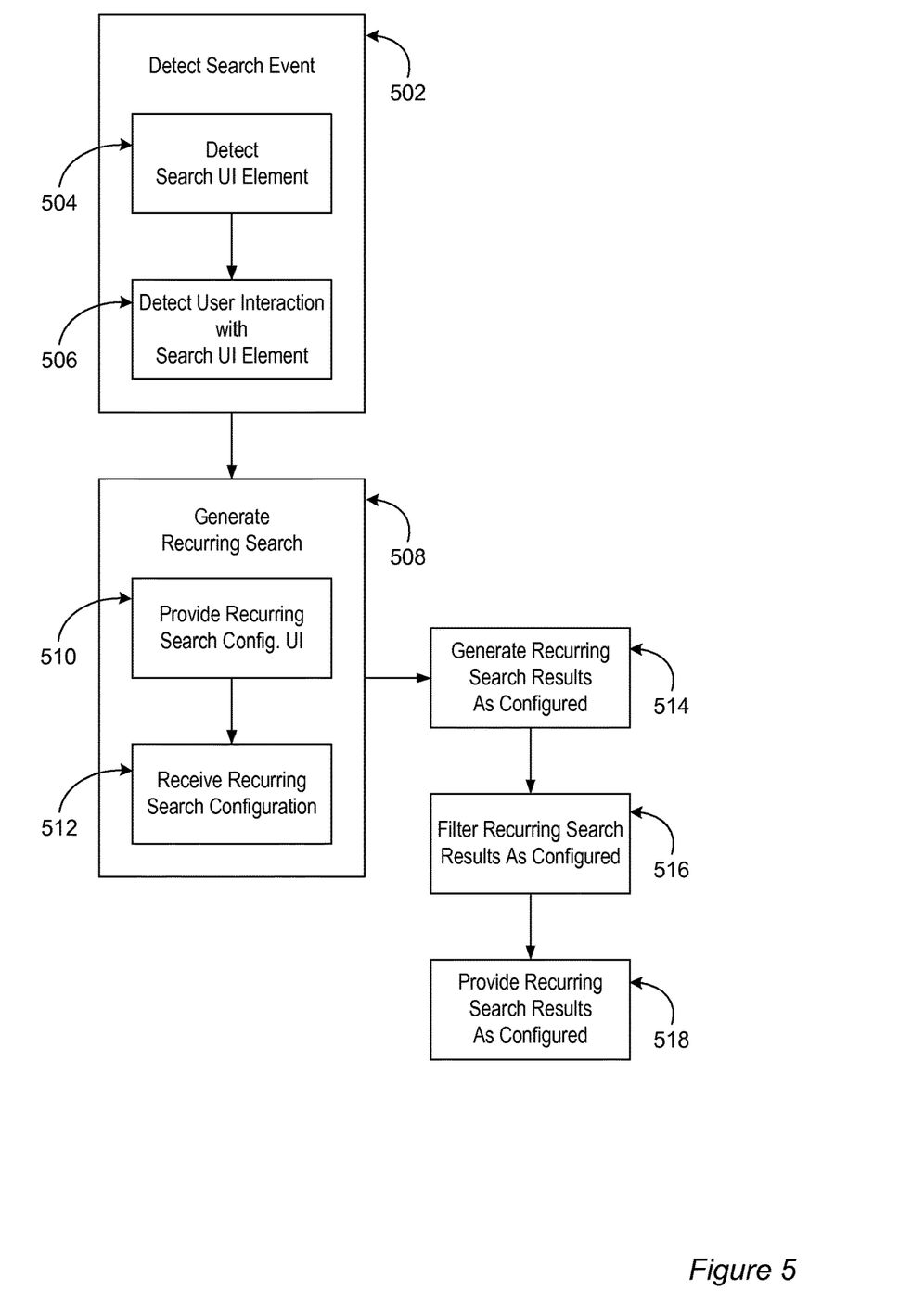
FIG. 5 is a flowchart depicting example steps for recurring search automation in accordance with at least one embodiment of the invention.

Having described aspects of a suitable computing environment, the description now turns to procedures that may be performed in the context of the computing environment. FIG. 5 depicts example steps for recurring search automation with search event detection in accordance with at least one embodiment of the invention. At step 502, a search event may be detected, for example, by the search detection module 302 of FIG. 3. FIG. 5 depicts example steps that may be performed as part of step 502. At step 504, a search user interface element may be detected. For example, the GUI heuristics module 310 may identify the search user interface element in a graphical user interface maintained by the content browser 204 of FIG. 2. At step 506, user interaction with the search user interface element may be detected. For example, responsive to detecting the search user interface element, the GUI heuristics module 310 may begin monitoring user input (e.g., monitoring mouse and/or keyboard input) and further detect that the user has selected the search user interface element for keyboard input and/or that the user has input search terms with respect to the search user interface element.

At step 508, a recurring search may be generated. For example, the recurring search module 300 (FIG. 3) may interact with the recurring search service 400 (FIG. 4) to create, configure and activate a recurring search agent. FIG. 5 depicts example steps that may be performed as part of step 508. At step 510, a recurring search configuration user interface may be provided. For example, the search agent configuration module 304 of FIG. 3 and/or the search agent configuration module 408 of FIG. 4 may act to provide the recurring search configuration user interface to the user. At step 512, recurring search configuration may be received, for example, responsive to user interaction with the provided user interface.

At step 514, search results may be generated in accordance with the recurring search generated at step 508. For example, the search agent scheduler 416 (FIG. 4) may cause one or more recurring search agents in the search agent instance data store 412 to perform recurring searches as configured. At step 516, the search results generated at step 514 may be filtered. For example, the search result presentation module 420 may filter the search results in accordance with recurring search agent configuration and/or user preferences. At step 518, the filtered search results may be provided. For example, the search result presentation module 420 may format and deliver the filtered search results of step 516 in accordance with recurring search agent configuration and/or user preferences.

Figure 6:
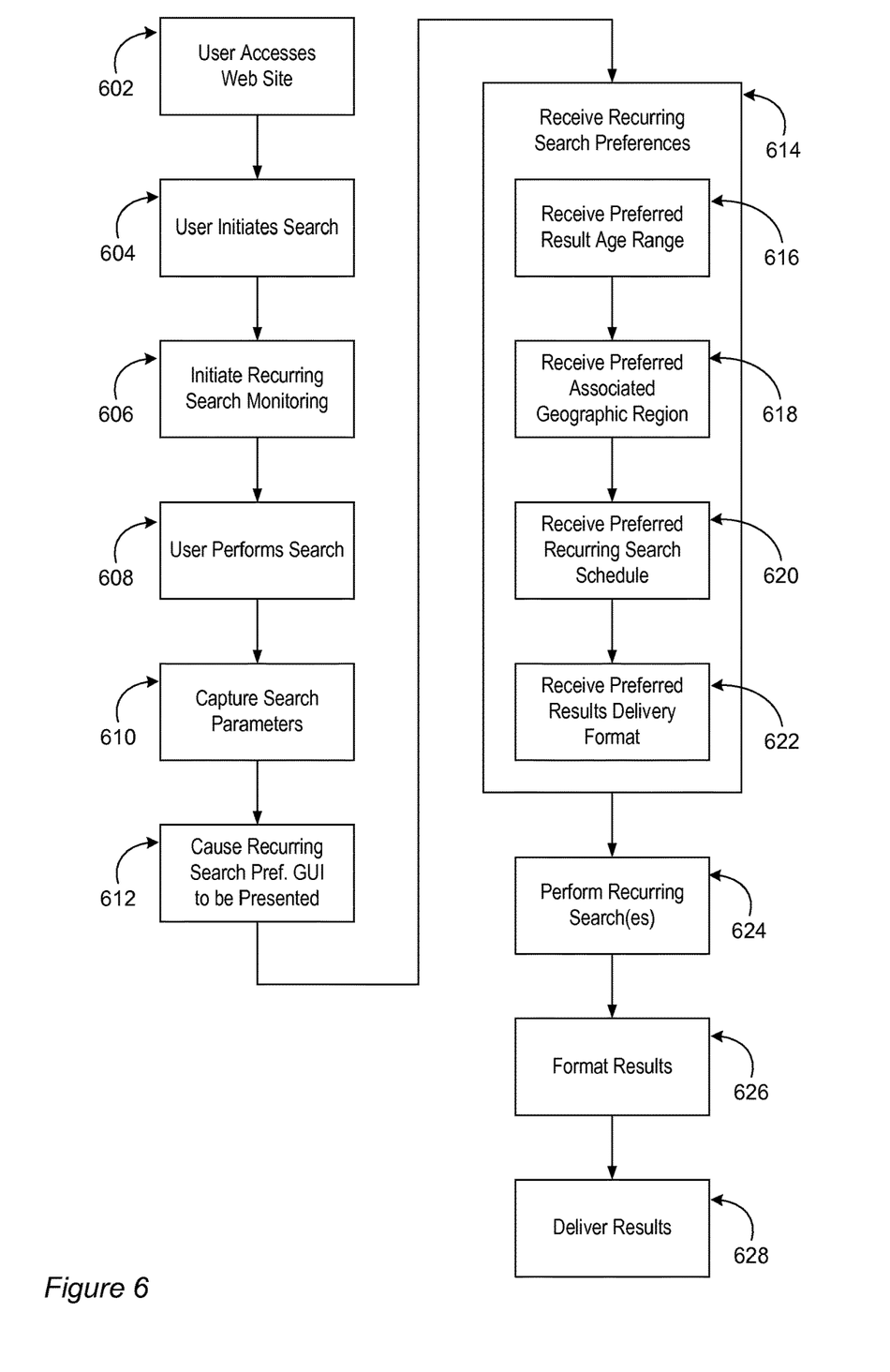
FIG. 6 is a flowchart depicting further example steps for recurring search automation in accordance with at least one embodiment of the invention.

FIG. 6 depicts example steps for recurring search automation in accordance with at least one embodiment of the invention. At step 602, a user may access a web site. For example, the web site may be one of the content providers 112 of FIG. 1, and the user may use one of the clients 102-110 to access the web site. At step 604, the user may initiate a search. For example, the web site may incorporate a search user interface element, and the user may select the search user interface element in order to input search terms. At step 606, recurring search monitoring may be initiated. For example, the recurring search module 208 (FIG. 2) may begin monitoring user input. At step 608, the user may perform a search. For example, the user may submit search terms that were input with the search user interface element, and the web site may update a provided web page with the search results. At step 610, parameters of the search may be captured. For example, the recurring search module 208 may identify and store the search terms that were input with the search user interface element.

At step 612, a recurring search preference graphical user interface (GUI) may be presented. For example, the recurring search module 208 (FIG. 2) may cause the recurring search preference GUI (e.g., the recurring search agent configuration user interface) to be presented to the user. The recurring search module 208 may cause one or more fields of the recurring search preference GUI to be pre-populated, for example, with the search parameters captured at step 610 and/or in accordance with an associated user profile 414 (FIG. 4). At step 614, recurring search preferences may be received. For example, the search agent configuration module 408 of FIG. 4 may receive the recurring search preferences obtained with the recurring search preference GUI, and may create and activate one or more recurring search agents configured accordingly.

FIG. 6 depicts example steps that may be performed as part of step 614. At step 616, a preferred result age range may be received, for example, by the search agent configuration module 408 of FIG. 4. The result age range may specify an oldest time before present, an oldest search result desired and a youngest search result desired, or any suitable search result age range. At step 618, a preferred associated geographic region may be received, for example, by the search agent configuration module 408. At step 620, a preferred recurring search schedule may be received, for example, by the search agent configuration module 408. At step 622, a preferred results delivery mode and/or format may be received, for example, by the search agent configuration module 408. At step 624, one or more recurring searches may be performed. For example, the search agent scheduler 416 may cause one or more active recurring search agents to perform their configured searches. At step 626, search results generated at step 624 may be formatted for presentation, for example, by the search result presentation module 420. At step 628, the formatted search results may be delivered. For example, the search result presentation module 420, may deliver the search results to the originating client 102-110 (FIG. 1) and/or to a destination in accordance with the generating recurring search agent and/or the user profile.

Figure 7:
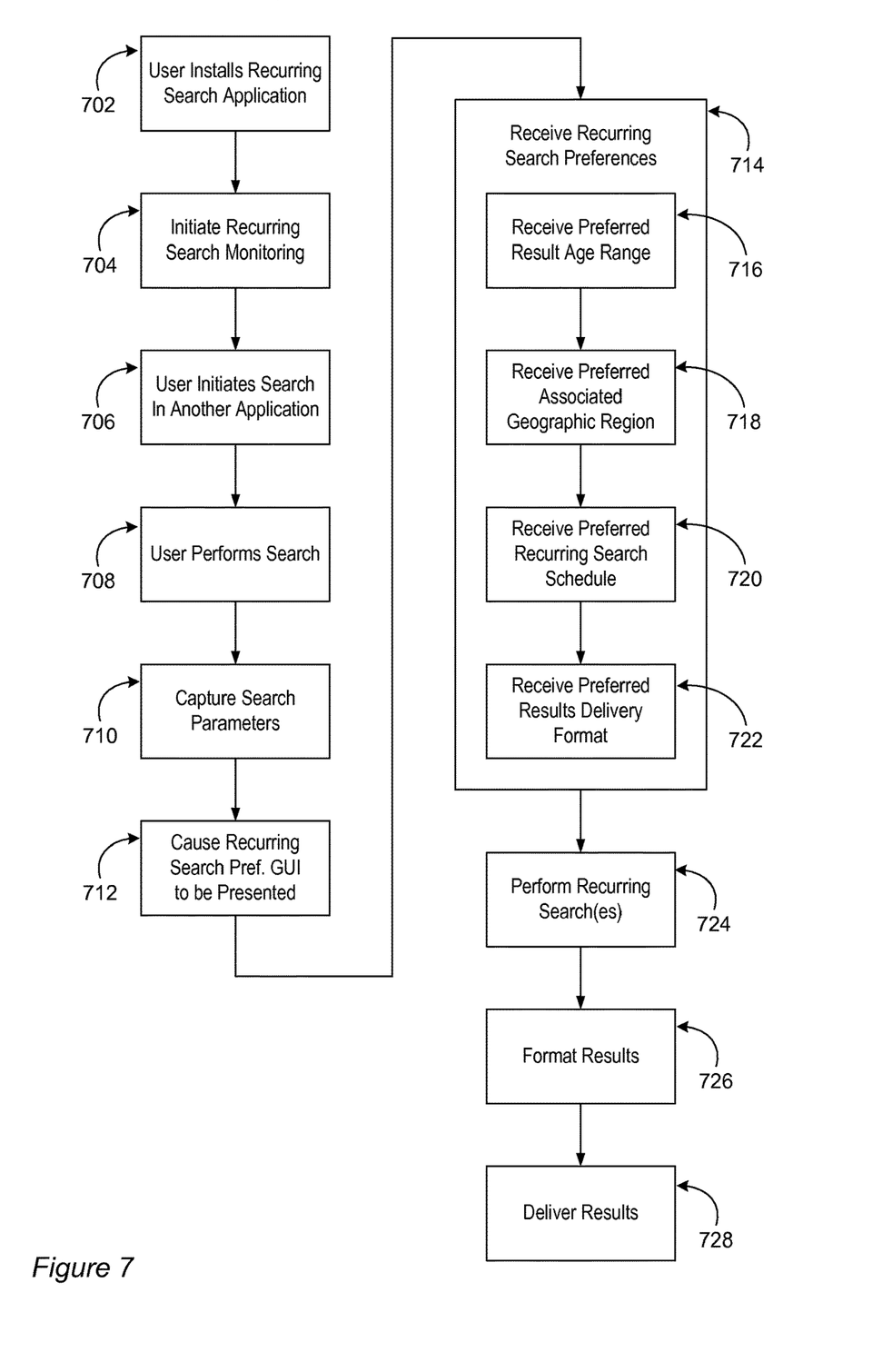
FIG. 7 is a flowchart depicting still further example steps for recurring search automation in accordance with at least one embodiment of the invention.

FIG. 7 depicts example steps for recurring search automation in accordance with at least one embodiment of the invention. At step 702, a user may install a recurring search application. For example, the user may install the monitoring application 212 of FIG. 2. At step 704, recurring search monitoring may be initiated. For example, the monitoring application 212 may be run as a "background" application and/or service. At step 706, the user may initiate search in another application. For example, the user may open the content browser 204, navigate to a search engine 114 (FIG. 1) and select a search user interface element of a corresponding web page. At step 708, the user may perform a search. For example, the user may submit search terms that were input with the search user interface element, and the web site may update a provided web page with the search results. At step 710, parameters of the search may be captured. For example, the recurring search module 214 may identify and store the search terms that were input with the search user interface element.

At step 712, a recurring search preference graphical user interface (GUI) may be presented. For example, the recurring search module 214 (FIG. 2) may cause the recurring search preference GUI (e.g., the recurring search agent configuration user interface) to be presented to the user. The recurring search module 214 may cause one or more fields of the recurring search preference GUI to be pre-populated, for example, with the search parameters captured at step 710 and/or in accordance with an associated user profile 414 (FIG. 4). At step 714, recurring search preferences may be received. For example, the search agent configuration module 408 of FIG. 4 may receive the recurring search preferences obtained with the recurring search preference GUI, and may create and activate one or more recurring search agents configured accordingly.

FIG. 7 depicts example steps that may be performed as part of step 714. At step 716, a preferred result age range may be received, for example, by the search agent configuration module 408 of FIG. 4. The result age range may specify an oldest time before present, an oldest search result desired and a youngest search result desired, or any suitable search result age range. At step 718, a preferred associated geographic region may be received, for example, by the search agent configuration module 408. At step 720, a preferred recurring search schedule may be received, for example, by the search agent configuration module 408. At step 722, a preferred results delivery mode and/or format may be received, for example, by the search agent configuration module 408. At step 724, one or more recurring searches may be performed. For example, the search agent scheduler 416 may cause one or more active recurring search agents to perform their configured searches. At step 728, search results generated at step 724 may be formatted for presentation, for example, by the search result presentation module 420. At step 730, the formatted search results may be delivered. For example, the search result presentation module 420, may deliver the search results to the originating client 102-110 (FIG. 1) and/or to a destination in accordance with the generating recurring search agent and/or the user profile.

Figure 8:
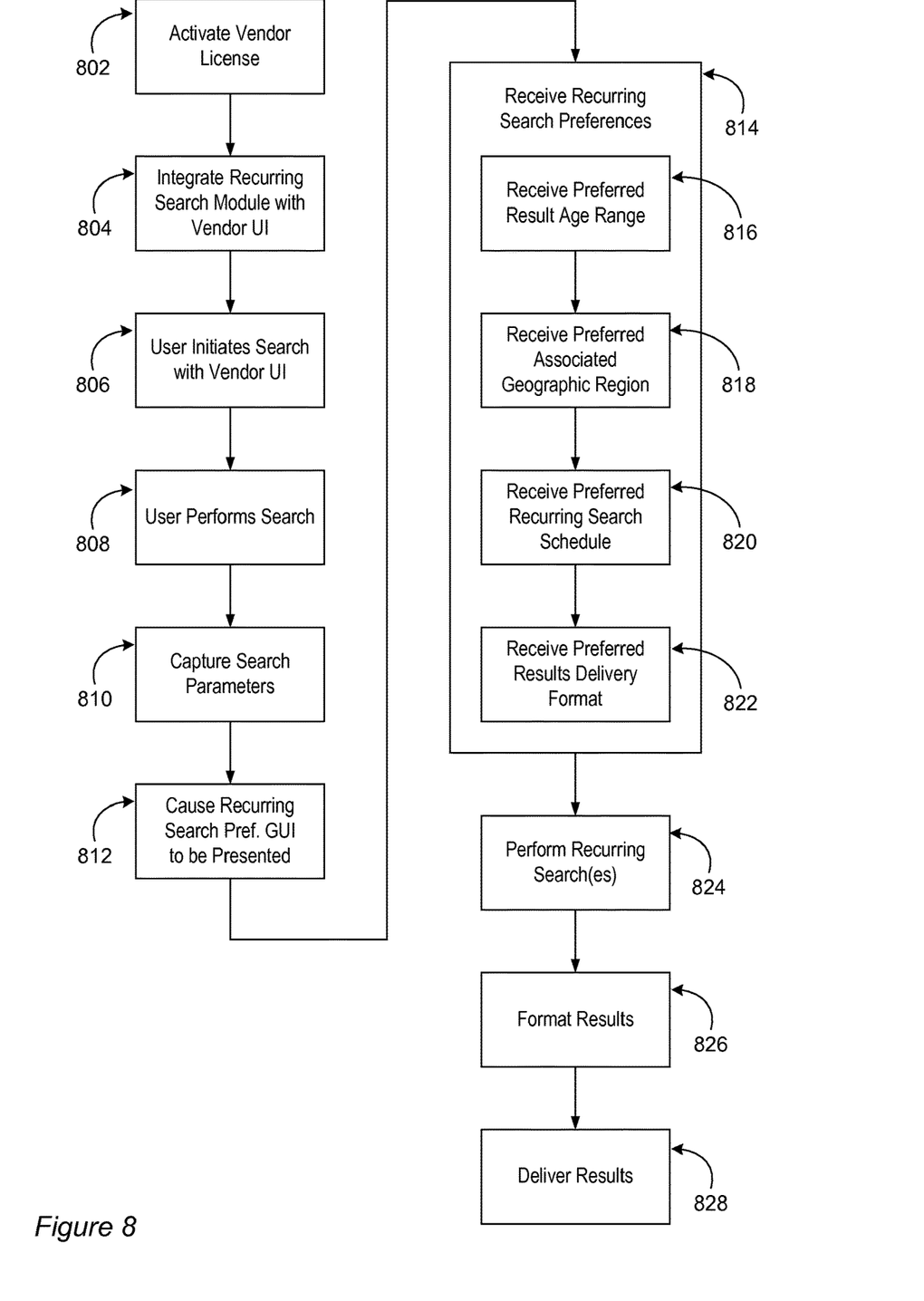
FIG. 8 is a flowchart depicting still yet further example steps for recurring search automation in accordance with at least one embodiment of the invention.

FIG. 8 depicts example steps for recurring search automation in accordance with at least one embodiment of the invention. At step 802, a vendor license may be activated. For example, the an administrator of the recurring search service 400 (FIG. 4) may approve a vendor license application, and the licensing engine 422 may be configured with a new license. At step 804, the recurring search module 210 (FIG. 2) may be integrated with a vendor user interface (e.g., a vendor web page). For example, the vendor may operate one or more content providers 112 (FIG. 1) and may integrate the recurring search module 210 with the content provider(s) 112. At step 806, a user may initiate a search with the vendor user interface. For example, the user may open the content browser 204, navigate to the vendor user interface and select a search user interface element. At step 808, the user may perform a search. For example, the user may submit search terms that were input with the search user interface element, and the vendor user interface may update a provided web page with the search results. At step 810, parameters of the search may be captured. For example, the recurring search module 210 may identify and store the search terms that were input with the search user interface element.

At step 812, a recurring search preference graphical user interface (GUI) may be presented. For example, the recurring search module 210 (FIG. 2) may cause the recurring search preference GUI (e.g., the recurring search agent configuration user interface) to be presented to the user. The recurring search module 210 may cause one or more fields of the recurring search preference GUI to be pre-populated, for example, with the search parameters captured at step 810 and/or in accordance with an associated user profile 414 (FIG. 4). At step 814, recurring search preferences may be received. For example, the search agent configuration module 408 of FIG. 4 may receive the recurring search preferences obtained with the recurring search preference GUI, and may create and activate one or more recurring search agents configured accordingly.

FIG. 8 depicts example steps that may be performed as part of step 814. At step 816, a preferred result age range may be received, for example, by the search agent configuration module 408 of FIG. 4. The result age range may specify an oldest time before present, an oldest search result desired and a youngest search result desired, or any suitable search result age range. At step 818, a preferred associated geographic region may be received, for example, by the search agent configuration module 408. At step 820, a preferred recurring search schedule may be received, for example, by the search agent configuration module 408. At step 822, a preferred results delivery mode and/or format may be received, for example, by the search agent configuration module 408. At step 824, one or more recurring searches may be performed. For example, the search agent scheduler 416 may cause one or more active recurring search agents to perform their configured searches. At step 828, search results generated at step 824 may be formatted for presentation, for example, by the search result presentation module 420. At step 830, the formatted search results may be delivered. For example, the search result presentation module 420, may deliver the search results to the originating client 102-110 (FIG. 1) and/or to a destination in accordance with the generating recurring search agent and/or the user profile.

In accordance with at least one embodiment of the invention, a web browser toolbar, plug-in or helper object may enable an ability for users to configure a recurring search at will. The recurring search may be maintained by a remote recurring search service. Over time, the recurring search service may learn about user search habits across content providers. The user's recurring searches may be managed with the recurring search service. Alternatively, or in addition, 3$^{rd}$ party vendors may license access to the recurring search service for and/or on behalf of their users. The recurring search service may then deliver search results to users based on user and vendor preferences. Accordingly, the users may receive (e.g., be pushed) relevant and timely vendor content, which can promote the vendor in the user's estimation.

Figure 9:
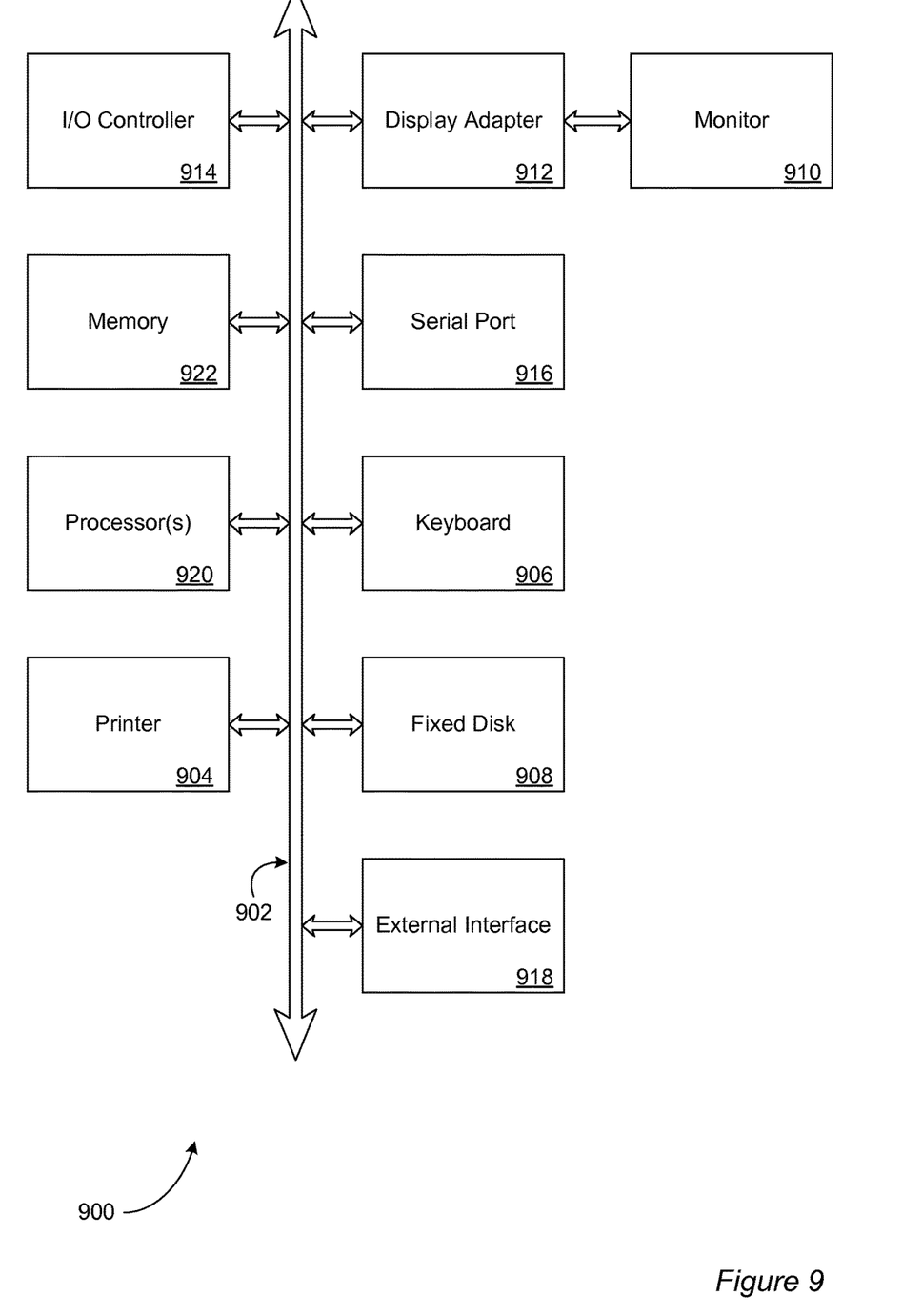
FIG. 9 is a schematic diagram depicting aspects of an example computer in accordance with some embodiments of the present invention.

In accordance with at least some embodiments, the system, apparatus, methods, processes and/or operations for recurring search automation may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 9 depicts aspects of elements that may be present in a computer device and/or system 900 configured to implement a method and/or process in accordance with some embodiments of the present invention. The subsystems shown in FIG. 9 are interconnected via a system bus 902. Additional subsystems such as a printer 904, a keyboard 906, a fixed disk 908, a monitor 910, which is coupled to a display adapter 912. Peripherals and input/output (I/O) devices, which couple to an I/O controller 914, can be connected to the computer system by any number of means known in the art, such as a serial port 916. For example, the serial port 916 or an external interface 918 can be utilized to connect the computer device 900 to further devices and/or systems not shown in FIG. 9 including a wide area network such as the Internet, a mouse input device, and/or a scanner. The interconnection via the system bus 902 allows one or more processors 920 to communicate with each subsystem and to control the execution of instructions that may be stored in a system memory 922 and/or the fixed disk 908, as well as the exchange of information between subsystems. The system memory 922 and/or the fixed disk 908 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method for recurring search automation, the method comprising:
   automatically identifying, by a processor, a search user interface component of a user interface in accordance with a search user interface component identification heuristic, the search user interface component identification heuristic comprising:
      determining a probabilistic correlation between a search event and the search user interface component of the user interface with respect to a plurality of user interactions with the search user interface component of the user interface,
      wherein the probabilistic correlation exceeds a threshold;
   causing to be detected, by the processor and the search user interface component, the search event associated with a search performed with the user interface and with respect to a search engine and wherein the search event is not explicitly identified to the processor as associated with the search user interface component of the user interface;
   responsive to the detection of the search event, generating, by the processor and the user interface, a recurring search based at least in part on information about the detected search event, the recurring search being associated with a recurrence schedule and being distinct from the detected search event performed with the user interface;
   generating, by the processor, search results at least in part by causing performance of the recurring search according to the associated recurrence schedule; and
   providing, by the processor, data corresponding to at least a portion of the generated search results for presentation.

2. The method in accordance with claim 1, wherein the user interface comprises a web-based graphical user interface.

3. The method in accordance with claim 1, wherein automatically identifying the search user interface component of the user interface in accordance with the search user interface component identification heuristic comprises automatically identifying the search user interface component of the user interface based at least in part on a pattern of user input.

4. The method in accordance with claim 3, wherein automatically identifying the search user interface component of the user interface based at least in part on the pattern of user input comprises determining at least one correlation between current user input and previous user input.

5. The method in accordance with claim 3, wherein automatically identifying the search user interface component of the user interface based at least in part on the pattern of user input comprises detecting input, by a user, of at least one search term that was previously used in at least one search by the user.

6. The method in accordance with claim 1, wherein automatically identifying the search user interface component of the user interface in accordance with the search user interface component identification heuristic further comprises automatically identifying the search user interface component of the user interface based at least in part on one or more structural aspects of the user interface independent of user interaction with the user interface.

7. The method in accordance with claim 6, wherein the user interface comprises a graphical user interface specified at least in part with a hypertext markup language and automatically identifying the search user interface component of the user interface based at least in part on one or more structural aspects of the user interface independent of user interaction with the search user interface component of the user interface comprises identifying the search user interface component of the user interface based at least in part on one or more structural aspects of the hypertext markup language specifying the graphical user interface.

8. The method in accordance with claim 6, wherein the user interface comprises a graphical user interface and automatically identifying the search user interface component of the user interface based at least in part on one or more structural aspects of the user interface independent of user interaction with the search user interface component of the user interface comprises identifying the search user interface component of the user interface based at least in part on one or more interrelationships between graphical user interface components of the graphical user interface independent of user interaction with the graphical user interface.

9. The method in accordance with claim 1, wherein detecting the search event further comprises detecting a search request sent responsive to user interaction with the user interface.

10. The method in accordance with claim 9, wherein the search request is not explicitly identified as the search request and detecting the search request comprises automatically identifying the search request in accordance with a search request identification heuristic.

11. The method in accordance with claim 10, wherein automatically identifying the search request in accordance with the search request identification heuristic comprises automatically identifying the search request based at least in part on one or more structural aspects of contents of the search request.

12. The method in accordance with claim 11, wherein the search request comprises a message of a hypertext transfer protocol and automatically identifying the search request in accordance with the search request identification heuristic comprises automatically identifying the search request based at least in part on one or more interrelationships between elements of the message of the hypertext transfer protocol.

13. A computing system for recurring search automation, the computing system comprising:
   a processor; and a memory comprising computer-executable instructions that when executed by the computing system cause the processor to:

automatically identify a search user interface component of a user interface in accordance with a search user interface component identification heuristic, the search user interface component identification heuristic comprising:

determining a probabilistic correlation between a search event and the search user interface component of the user interface with respect to a plurality of user interactions with the search user interface component of the user interface, wherein the probabilistic correlation exceeds a threshold;

detect search events associated with searches performed with one or more user interfaces and with respect to one or more search engines and wherein the search event is not explicitly identified to the processor as associated with the search user interface component of the user interface, the user interface comprising a graphical user interface and the search user interface component identification heuristic being based at least in part on one or more structural aspects of a rendered appearance the graphical user interface;

generate a recurring search responsive to detection of a search event, the recurring search being based at least in part on information about the detected search event provided by the search detection module and associated with a recurrence schedule and being distinct from the detected search event performed with the one or more user interfaces;

generate search results at least in part by causing performance of the recurring search according to the recurrence schedule; and provide data corresponding to at least a portion of the generated search results for presentation.

14. The system in accordance with claim 13, wherein the detection of the search events is incorporated in an installable toolbar and/or plug-in of a web browser.

15. The system in accordance with claim 14, wherein the recurring search responsive to the detection of the search event is implemented at least in part by at least one server remote from the web browser.

16. One or more non-transitory computer-readable media collectively having thereon computer-executable instructions that configure one or more computers to collectively, at least:

automatically identify a search user interface component of a user interface in accordance with a search user interface component identification heuristic, the search user interface component identification heuristic comprising:

determining a probabilistic correlation between a search event and the search user interface component of the user interface with respect to a plurality of user interactions with the search user interface component of the user interface, wherein the probabilistic correlation exceeds a threshold;

causing to detect a search event associated with a search performed with a user interface and with respect to a search engine and wherein the search event is not explicitly identified to the processor as associated with the search user interface component of the user interface, the user interface comprising a graphical user interface and the search user interface component identification heuristic being based at least in part on one or more interrelationships between rendered appearances of graphical user interface components of the graphical user interface;

generate, by the processor and the user interface, a recurring search object based at least in part on information about the detected search event, the recurring search object including a specification of a recurrence schedule and being distinct from the detected search event performed with the user interface;

generate, by the processor, search results at least in part by causing performance of at least one search in accordance with the recurring search object; and provide, by the processor, data corresponding to at least a portion of the generated search results for presentation.

17. The method in accordance with claim 1, wherein the user interface comprises an email-based user interface.

18. The method in accordance with claim 1, wherein the user interface comprises a short message service-based user interface.

19. The method in accordance with claim 1, wherein the detection of the search events is incorporated in an installable toolbar and/or plug-in of a web browser.

20. The method in accordance with claim 1, wherein the threshold is greater than 0% and less than 100%.

21. The method in accordance with claim 1, wherein the detection of the search events are implemented by a hypertext markup language or a script-style programming language independent of being previously specified by the computing system.

22. The method in accordance with claim 21, wherein the hypertext markup language is HTML.

23. The method in accordance with claim 21, wherein the script-style programming language is specified in accordance with an ECMAScript standard.

24. The method in accordance with claim 1, wherein the probabilistic correlation is implemented independent of computer-executable instructions stored with the user interface.

* * * * *